United States Patent [19]

Boone

[11] 4,337,281

[45] Jun. 29, 1982

[54] METHOD FOR STRIPING INSIDE SEAMS OF CANS

[75] Inventor: Jacob J. Boone, Vermilion, Ohio

[73] Assignee: Nordson Corporation, Amherst, Ohio

[21] Appl. No.: 237,891

[22] Filed: Feb. 25, 1981

[51] Int. Cl.³ .......................... B05D 7/28; B05D 7/14
[52] U.S. Cl. ..................................... 427/236; 427/239
[58] Field of Search ................................ 427/236, 239

[56] References Cited

U.S. PATENT DOCUMENTS 3,778,292 12/1973 Rood et al. .......................... 427/236
3,816,165 6/1974 Horvath et al. ..................... 427/236
3,921,570 11/1975 Hogstrom et al. ................... 118/685
3,995,075 11/1976 Cernauskas et al. ................ 427/236

Primary Examiner—James R. Hoffman
Attorney, Agent, or Firm—Wood, Herron & Evans

[57] ABSTRACT

A method for striping the inside seams of cans comprising airlessly spraying a stripe of liquid coating material onto the inside seam of a welded seam can wherein a spray pattern of liquid material is emitted from the airless spray apparatus and impacted against the seam of the can before the spray has an opportunity to break apart and atomize.

11 Claims, 5 Drawing Figures

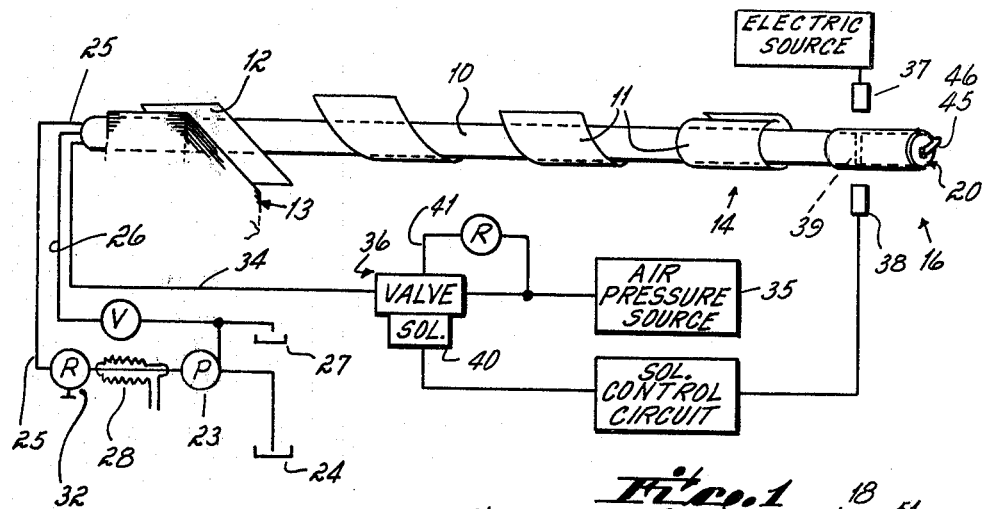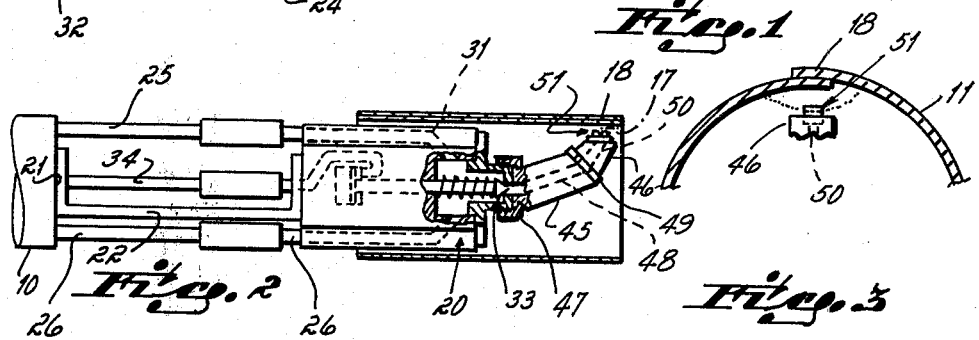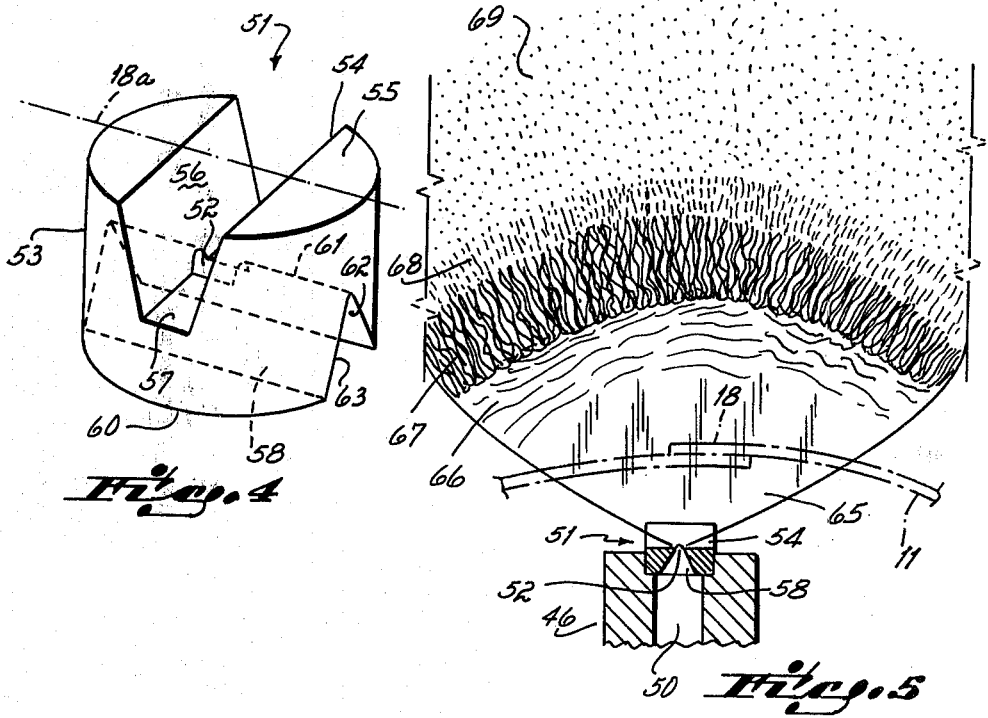

METHOD FOR STRIPING INSIDE SEAMS OF CANS

BACKGROUND OF THE INVENTION

This invention relates to the application of protective coatings to the interior seams of cans and, more particularly, to the application of protective coatings to the interior of the welded overlapped seam or the butt weld seam of a three-piece metal can.

Metal cans are made by either one of two processes. One process, the two-piece can process, involves forming a drawn cup from a cylindrical slug of metal and then deep drawing the cup to a can configuration. The other process, the three-piece process, involves forming a cylindrical can body from a sheet of metal and then attaching two lids or ends to the opposite ends of the body. The present invention is concerned only with the application of protective coatings to three-piece cans.

In the manufacture of three-piece cans, the cylindrical bodies of the cans are formed by wrapping a sheet or blank of metal around a so-called stubhorn. The ends of the sheet are either butted or overlapped and secured together by a welded seam, a soldered seam, or a cemented seam. The interior of this seam is then coated with a protective coating, the function of which is to protect the contents of the can against metal contamination. In the application of this coating, continuity is extremely critical because any pinholes, cracks or imperfections in the integrity of the coating will generally render the can unsuitable for most applications.

After application, the coating is cured by heating. This curing process is applied only to the area of the can seam. Therefore, any coating material applied to the interior of the can which is not upon the seam area will not be cured.

The present invention is primarily concerned with applying this continuous coating onto welded can seams. Welded can seams tend to be more brittle and more irregular than soldered can seams, and, therefore, require a generally thicker coating, usually about 6 milligrams of dried resin material per square inch.

Methods capable of applying such a thick coat of material include powder coating and roller coating methods. These methods are extremely expensive and the apparatus is difficult to maintain.

A third method is airless spray. Although an air spray is frequently used to coat a can seam with a thin layer of material, it is impractical to apply a thick coat of material using air spray. The present invention is directed to a method and apparatus for airlessly spraying a thick stripe of a protective coating onto the welded seam of a can body.

Hogstrom U.S. Pat. No. 3,921,570 discloses an apparatus for airlessly spraying a thin coating of material onto a can seam. This apparatus is designed to airlessly spray an atomized mist of material onto a can seam. The apparatus was designed to spray a low solids material which is easily atomized.

To apply a thick coat, a higher solids coating material is needed. Generally, the material is 20 to 40 or more percent solids. Such coating material is not easily atomized. If the apparatus as described in Hogstrom were used with a high solids coating, the coating material would not completely atomize and as a consequence, it would tend to bounce off the seam of the can onto other portions of the can. Consequently, this material, commonly referred to as rebound, would not be cured. The rebound would then itself constitute a contaminant to the contents of the can.

It is an object of the present invention to prevent this rebound. Specifically, the object of the present invention is to airlessly spray a thick coating of a high solids material onto a welded seam of a can body without significant rebound. This is accomplished, according to the practice of this invention, by airlessly spraying the coating material through a nozzle orifice onto a can seam and positioning the nozzle close enough to the can seam that the coating material does not break up or atomize before it hits the can seam. We have found that this invention is in part predicated upon the discovery that by positioning the nozzle close enough to the can seam, a high solids coating material can be airlessly sprayed onto a can seam without significant rebound.

This enables one to apply a thick stripe of coating material onto the seam of a can using airless spray apparatus, which in turn allows one to apply a stripe of controlled width and thickness. Such a system is more reliable than other striping methods presently used to apply a thick stripe of material. Furthermore, the present method of applying a stripe is significantly less expensive than these alternate methods.

These and other objects and advantages of this invention will be more readily apparent from the following description of the drawings in which:

FIG. 1 is a diagrammatic illustration of a can body production line including the novel inside striping mechanism of the present invention;

FIG. 2 is an enlarged side elevational view of the can striping mechanism of this invention;

FIG. 3 is an end elevational view partially cut away of the striping mechanism of FIG. 2;

FIG. 4 is an isometric view of the nozzle tip preferably used in the present invention; and FIG. 5 is a cross section of the spray emerging from the nozzle tip.

Referring first to FIG. 1, there is illustrated diagrammatically a standard can production line used in the production of cylindrical can bodies. The line includes a stubhorn 10 which acts as a mandrel around which can bodies 11 can be formed as they pass downstream over the stubhorn. The can bodies are formed from metal blanks 12 while they are moved longitudinally over the stubhorn from a magazine 13 by lugs (not shown) of a chain conveyor (not shown). These lugs engage the rear edge of the can bodies and push the bodies along the stubhorn. As the bodies pass off the stubhorn, after having been formed into a cylindrical configuration, they move away from the stubhorn for further processing. In the final stages of movement of the can bodies 11 over the stubhorn 10, the ends of the sheet metal from which the body is made are overlapped at a seaming station indicated by the numeral 14. The seaming station consists of a welding operation where the overlapped edges of the blank are welded together. Although the present invention is not necessarily limited to welded can seams and will function properly with cans seamed together by means of adhesive or solder, the present invention is designed to overcome problems encountered with welded can seams.

As the bodies pass off the stubhorn 10, they are crimped and passed through an inside striping station indicated by the numeral 16. At this station, a stripe of protective material 17 (FIG. 2) is sprayed over the overlapped seam 18 of the can.

In order to apply the stripe 17 of protective material over the seam of the can, a spray gun 20 is secured to the end of the stubhorn. This gun is so positioned that the can bodies pass over it as they move away from the stubhorn.

The gun is secured to the end surface 21 of the stubhorn by a generally U-shaped bracket 22. The spray gun 20 is of the so-called circulating flow type. That is, material is continuously forced by means such as a pump 23 from a material source 24 through fluid inlet line 25 to the gun 20. There is also a continuous flow of fluid or lacquer from the gun via line 26 back to the pump 23 or alternately, to a waste receptacle 27. As a result of this continuous flow, the temperature of the fluid or lacquer may be maintained constant in the gun even when the gun is not in use and the fluid would otherwise be stationary in the gun. Since the lacquers preferably used in the present invention comprise high solid coatings which are extremely viscous, these are generally heated by means such as a heater 28 along line 25 and applied at a temperature substantially above room temperature. This lowers the viscosity of the material and enables the material to be transported more efficiently. It is important that the temperature be maintained relatively constant to keep the spray pattern consistent. Continuous circulating of the coating material through the gun and through the heater enables the temperature and viscosity of the material to be maintained substantially constant.

The gun 20 is specifically described in Hogstrom U.S. Pat. No. 3,921,570, the disclosure of which is hereby incorporated by reference. Basically, the gun 20 is a valved fluid applicator containing a flow path 31 in communication with a spray nozzle 46 at one end and the pressurized line 25 of coating material at the opposite or inlet end.

The line 25 is connected to pump 23 which maintains the liquid material in line 25 at elevated pressure. Preferably, line 25 also includes a pressure regulator 32 positioned between the pump and the gun 20 to maintain the pressure at the gun substantially constant. As stated, line 25 preferably includes an in-line heater 28.

Within the gun 20 there is a fluid return flow path from fluid inlet 25 through the gun to fluid return line 26. This fluid return flow path allows the gun to recirculate coating material when the material is not being sprayed onto a can seam surface.

The gun 20 functions as a means to control the emission of coating material from the nozzle 46. It contains a flow control valve 33 which is pneumatically operated by air pressure supplied to the gun via an air line 34. The valve 33 is preferably spring biased to a closed position. Air pressure at approximately 60 psi is supplied to the air line 34 from an air pressure source 35 through a solenoid controlled valve 36.

An electric photocell circuit including a photocell transmitter 37 and receiver 38 are located at or near the can striping station 16 adjacent the end of the stubhorn. This photocell directs a light beam through a hole 39 in the stubhorn so that cans entering the striping station break the circuit and actuate a solenoid 40, thereby causing the valve 36 to be opened and air pressure supplied via line 34 to the gun 20. This air pressure in line 34 is operable to open the flow control valve 33 of gun 20.

The solenoid valve 36 is a conventional four-way spool valve. This valve 36 is operative to connect a source of air pressure 35 at approximately 60 psi to line 34 or alternatively, to connect line 34 to atmosphere under the control of the solenoid. Air at a lesser pressure, as for example, 20 psi, is supplied through a line 41 to the opposite end of the spool at all times so that when the solenoid electrical circuit is broken, the solenoid valve connects the high pressure end of the spool valve 36 to atmospheric pressure and the low pressure (20 psi) at the opposite end then moves the spool towards the high pressure end. When the electrical circuit again energizes the solenoid, the solenoid valve 36 connects the high pressure end of the spool to 60 psi and the spool immediately moves towards the low pressure end against the resistance offered by the low pressure line 41. It has been found that the valve 36 may be more reliable with the low pressure line connected to one end of the valve than it is when it utilizes a spring return. It has also been found that the solenoid valve may be fast enough acting when used as pilot valve to control flow to the gun but that if used with higher flow capacities without the second stage spool valve 36, it is too slow to keep up with current can production lines.

The outlet flow passage of the gun 20 is connected by an adaptor or extension 45 to the nozzle 46. The extension 45 is attached to the outlet end of the gun by a conventional threaded connection (not shown) and a locking nut 47. The extension 45 provides a fluid passageway 48 from the gun 20 to nozzle 46 and allows the nozzle to be positioned very closely to the passing can bodies. In addition, because of the presence of the extension 45, if a can body collides with the nozzle 46, it will not harm the gun, but will only damage the nozzle and extension, both of which can easily be replaced.

The nozzle 46 is secured to the outer end of the extension 45 by means of a locking sleeve 49. The nozzle provides a fluid flow passageway 50 from the extension 45 to a nozzle tip 51. The tip 51 defines an orifice 52 through which the liquid coating material is emitted from the spraying apparatus.

With reference to FIGS. 4 and 5, it will be seen that the nozzle tip 51 comprises a cross cut carbide disc 53. This disc is secured within the nozzle 46 by being brazed within a counterbored passage of the nozzle.

The cross-cut nozzle is made from an abrasive resistant metal such as tungsten carbide. In practice, it is very small and in a typical applicator has a thickness dimension of approximately 0.075 inches and a cylindrical diameter of approximately 0.110 inches.

The disc 53 contains an outer trapezoidal groove 54 passing through the outer planar surface 55 of the disc. The sidewalls 56 of the trapezoidal groove slope outwardly from the bottom surface 57. Acceptable angles between the sidewalls 56 and the flat bottom 57 will vary depending on the desired spray pattern. In certain cases, the slope may even be such as to define a generally triangular cross section in which the base or bottom 57 is simply a straight edge. In use, this outer planar surface is the unpressurized outside face of the nozzle tip which is located closest to the can seam 18 (represented in FIG. 4 by a broken line 18a).

Disc 53 includes a second triangular cross section or wedge-shaped groove 58 through the inside planar surface 60. Wedge-shape groove 58 has a substantially triangular cross section with a substantially straight bottom edge 61 and two intersecting side walls 62 and 63. The bottom edge 61 of groove 58 is perpendicular to the base or bottom edge of the first trapezoidal groove 54. In use, the second planar surface is the pressurized surface or face of the nozzle tip located within the nozzle 46.

The trapezoidal groove 54 and the wedge-shaped groove 58 intercept each other, thereby defining an orifice 52 through disc 53. By altering the extent of the intersection of the two grooves, as well as by altering the width of the base 57 of trapezoidal groove 55, the angulation of the side walls of the intersecting grooves, the pattern of spray emitted from the orifice 52 may be charged.

A more complete description of the nozzle and cross cut nozzle tip may be found in patent application Ser. No. 706,361, filed July 19, 1976, and assigned to the assignee of this application.

The operation of the nozzle described herein is affected not only by the configuration of the nozzle tip, but also by the operating conditions of the coating apparatus. With reference to FIG. 5, it will be seen that as the spray issues from the nozzle orifice, it spreads out. In this figure, the seam 18 shown by a broken line indicates the position of the longitudinal seam of a can passing the nozzle tip. When the material emerges from the nozzle orifice, it is initially in the form of a solid curtain of liquid 65 which, as it spreads out, thins out until eventually external forces, particularly air disturbances, cause ripples 66 in the spray pattern. The ripples then break up into longitudinal ligaments indicated by numeral 67. These ligaments subsequently break up as they move away from the nozzle into droplets 68 which then atomize into a fine spray 69.

Where this break up and atomization occurs relative to the nozzle orifice, depends in part on the operating conditions of the spraying apparatus. Under high pressures, the atomization occurs closer to the orifice due to the increased violent forces caused by the higher pressure themselves. In addition, the fan angle widens more quickly under higher pressures, which also causes the material to atomize more quickly. Other factors which affect the distance the material will travel before it atomizes include the solids content of material, its viscosity, and its temperature.

In operation, can bodies 11 are generally formed over the stubhorn 10 at the rate of approximately 550 cans per minute. This rate varies from one can manufacturer to another, but quite commonly today averages approximately 575 can bodies per minuter per line in the production of standard 3 or 3 and 3/16 inches diameter cans of 4 inch length. As the cans move along the stubhorn, a weld is applied to the overlapping or abutting edges of the sheet of the seaming station 14. The station is located immediately in front of the stripe station 16 where the stripe of protective material from the nozzle 46 and spray gun 20 is directed on the seam. The striping material is then heat cured at a station (not shown) further down the line.

The emission of liquid spray from the nozzle 46 is turned on and off in synchronization with movement of can bodies 11 over the stubhorn through the striping station. This is accomplished by the can body interrupting a light beam in the photocell transmitter and receiver unit 37, 38. Upon interruption of this light beam and after a predetermined time delay built into a solenoid control circuit, the solenoid control circuit is operable to shift the solenoid and move a valve spool of the valve 36 so as to connect the air line 34 to the source of air pressure 35, thereby opening the flow control valve 33 and then allowing the liquid material to pass from the gun 20 into the conduit or passage 48 to nozzle 46 and subsequently to the mozzle orifice 52.

A predetermined time after interruption of the light beam, the can which has broken the light beam passes out of alignment with nozzle 46. After the predetermined time, a timer circuit interrupts the signal to the solenoid, causing it to be de-energized and the control circuit to be reset preparatory to interruption of the light beam by the next following can. Upon de-energization, the solenoid, low air pressure, i.e., 20 psi in line 41 then moves the spool of the valve 36 to the position in which the air line 34 is connected to atmospheric pressure. This results in the valve 33 in gun 20 closing which immediately cuts off the flow of spray from the nozzle until the next can again interrupts the light beam.

According to the present invention, the spray of coating material is applied to the seam of the can in a curtain of material in the absence of atomization. This enable a highly viscous high solids content coating material to be applied onto a can seam without any appreciable rebound or splash of liquid material out of the strip area of the can. This is accomplished by positioning the nozzle tip close enough to the line of travel of the can seam that the coating material strikes the can seam prior to atomization. The preferred position of the can seam is shown in FIG. 5 in which the seam 18 of a can 11 is indicated by broken lines. The seam may be positioned in either the solid curtain of liquid material 65 or the rippled area 66 of the spray. But if it is located in the ligamental area 67 or atomized areaa 68 or 69, unacceptable rebound or splash occur.

Although there is some variance, it is generally desirable to apply approximately at least 6 milligrams per square inch of cured coating material to a welded seam of a can body. Otherwise stated, it is generally desirable to apply a coating over a welded can seam at least 9 microns in thickness when measured after curing of the coating material.

Experimentally, it was determined that a high solids content liquid spray material could be applied as a stripe ½ inch wide using coating material with a viscosity of 30 seconds (using a Zahn No. 2 cup) at room temperature. The liquid was supplied to the nozzle of a pressure of 100 psi. The nozzle was positioned 3/16 of an inch from the can seam. The nozzle was a cross cut nozzle and had a flow rate of 0.02 gallons per minute and formed a 2½ inch wide fan pattern at one inch. The trapezoidal wedge-shaped groove of the nozzle was in this instance a so-called "degenerate trapezoid" having a triangular cross section. The angle of both the trapezoidal and wedge-shape grooves was 25°. These spraying conditions resulted in a satisfactory stripe of liquid lacquer material being applied onto the welded seam of a can body which measured 11.5 milligrams per square inch of cured resin.

It will be obvious to persons of ordinary skill in the art to vary these parameters based on this disclosure to obtain results which are optimal for a particular operation. Preferably, the pressure measured at the nozzle should be between 75 to 250 psi, and generally on the order of between 100 to 200 psi. If the viscosity of the material is substantially higher than 30 seconds, Zahn No. 2 cup, higher pressures may be required.

At the lower pressures, atomization takes place further away from the nozzle and a wider spray may be obtained by positioning the nozzle further from the substrate. However, at these lower pressures, even slight variations in pressure cause the fan pattern to vary significantly. At higher pressures, there is more consistency, but atomization occurs more quickly. Therefore, the nozzle must be located closer to the substrate. However, with higher pressures, the spray pattern widens more quickly.

Thus, three factors generally enter into the operation of the present invention, nozzle configuration, pressure, and distance from the substrate. The pressure will vary with the viscosity of the material. The distance will have to be varied to obtain a suitable spray pattern width using a particular nozzle. In addition, the spray pattern may be varied by changing the pressure of the spray. However, the critical point is that the spray of liquid coating material strike the substrate prior to atomization if rebound and splash are to be avoided.

While only one preferred embodiment of this invention has been described in detail herein, those persons skilled in the art to which this invention pertains will readily appreciate numerous changes and alterations which may be made without departing from this invention. Therefore, I do not intend to be limited except by the scope of the appended claims.

Having described my invention, I claim:

1. A method of applying a continuous impervious protective coating in the form of a stripe over the longitudinal welded seam area of can bodies, which method comprises the steps of:

moving a series of can bodies having longitudinally welded seams along a can forming line past the nozzle orifice of an airless spray applicator, locating said airless spray applicator interiorly of said can bodies with said nozzle orifice located in close proximity to said can seam, supplying a liquid coating material from a source of said coating material to said airless spray applicator at a pressure sufficient to atomize said liquid material when ejected from said airless spray nozzle, and ejecting said liquid coating material as an airless spray fan of coating material from said nozzle orifice onto the welded seam areas of said can bodies, said seam areas of said can bodies being located sufficiently close to said nozzle orifice that said liquid material is applied to said seam areas as an unatomized solid curtain of liquid coating material.

2. The method of claim 1 which further includes the step of curing said liquid coating material applied to said can seam areas, said liquid coating material being applied to said seam area in sufficient quantity as to leave a coating of at least six milligrams per square inch over the seam areas of said can bodies.

3. The method as claimed in claim 2 wherein said coating material in said pressurized line is heated.

4. The method as claimed in claim 1 wherein said coating material is a high solids coating material.

5. The method as claimed in claim 4 wherein said coating material is continuously circulated through said applicator.

6. The method claimed in claim 4 wherein said temperature is maintained at 110° to 170° F.

7. The method as claimed in claim 1 wherein the airless spray of coating material is intermittently forced from said nozzle in synchronization with the can bodies moving along the can forming line.

8. The method as claimed in claim 1 wherein the pressure in said pressurized line is maintained substantially constant.

9. The method claimed in claim 1 wherein the pressure of said liquid supplied to said airless spray applicator is maintained between about 75 to 250 psi.

10. The method claimed in claim 9 wherein the pressure of said fluid supplied to said airless spray applicator is maintained between 90 to 200 psi.

11. A method of applying a continuous impervious protective coating over the longitudinal seams of can bodies moving along a can forming line past a liquid applicator, which method comprises:

maintaining a pressurized line of said liquid coating material from a source of said coating material to said liquid applicator, said liquid applicator being secured to said can forming line and communicating with an airless spray nozzle through which said liquid coating material can be forced out and wherein said nozzle is located interiorly of said cans;

directing the orifice of said nozzle toward the interior surface of the seams of can bodies;

positioning said nozzle at an effective distance from the interior surface of said can seams that an airless spray of material emitted from said nozzle will impact said can seam prior to atomization; and forcing an airless spray of coating material from said nozzle.

* * * * *